(12) United States Patent
Atchison (10) Patent No.: US 11,883,839 B2
(45) Date of Patent: Jan. 30, 2024

(54) MOBILE LIQUID DISPERSION SYSTEM AND METHODS OF USE THEREOF

(71) Applicant: Andrew Atchison LLC, Bowie, TX (US)

(72) Inventor: Andrew Atchison, Bowie, TX (US)

(73) Assignee: Andrew Atchison LLC, Bowie, TX (US)

(*) Notice: Subject to any disclaimer, the term of this patent is extended or adjusted under 35 U.S.C. 154(b) by 506 days.

(21) Appl. No.: 16/937,742

(22) Filed: Jul. 24, 2020

(65) Prior Publication Data
US 2022/0023897 A1 Jan. 27, 2022

(51) Int. Cl.
| B05B 9/03 | (2006.01) |
| B05B 9/00 | (2006.01) |
| A01M 7/00 | (2006.01) |
| B60P 3/22 | (2006.01) |
| A01C 23/04 | (2006.01) |
| A01C 23/00 | (2006.01) |

(52) U.S. Cl.
CPC .............. *B05B 9/03* (2013.01); *A01C 23/008* (2013.01); *A01C 23/047* (2013.01); *A01M 7/0042* (2013.01); *A01M 7/0075* (2013.01); *A01M 7/0085* (2013.01); *B05B 9/007* (2013.01); *B60P 3/2215* (2013.01)

(58) Field of Classification Search
CPC ......... B05B 9/007; B05B 9/0423; B05B 9/03; B05B 1/1205; B05B 13/005; B05B 15/65; B60P 3/2215; B60P 3/30; A01C 23/008; A01C 23/047; A01M 7/0072; A01M 7/0075; A01M 7/0085
USPC ............... 222/1; 239/159; 172/311; 701/50
See application file for complete search history.

(56) References Cited

U.S. PATENT DOCUMENTS

| 4,673,130 | A | 6/1987 | Simpson | |
| 8,491,059 | B2 | 7/2013 | Smith | |
| 9,462,799 | B2* | 10/2016 | Bouten | A01M 7/0075 |
| 11,284,611 | B2* | 3/2022 | Smith | A01M 7/0089 |
| 2016/0312423 | A1* | 10/2016 | Kohn | E01H 10/007 |

OTHER PUBLICATIONS

Hydrabed, Product webpage; 1 page, Jul. 22, 2020 www.hydabeds.com/hydrabed.
Hydrafeeder, Product Webpage, 1 page, May 31, 2019 www.hydrabeds.com/hydrafeeder.

* cited by examiner

*Primary Examiner* — Lien M Ngo
(74) *Attorney, Agent, or Firm* — Carder W. Brooks (57) ABSTRACT

The present disclosure includes a mobile liquid dispensing system adaptable to be implemented on an arm-bed truck. The disclosure includes an apparatus comprising a spray rig capable of engaging arms of an arm-bed truck, and a carrier operable to be hoisted by an arm-bed truck. A method of mobile liquid dispersion is also presented that be performed from an arm-bed truck. The disclosure offers many advantages in the art, including novel uses of an arm-bed truck and a spray rig that is resistant to damage from impacts.

17 Claims, 11 Drawing Sheets

MOBILE LIQUID DISPERSION SYSTEM AND METHODS OF USE THEREOF

TECHNICAL FIELD

The present disclosure generally relates to liquid dispersion from a mobile platform, such as from a vehicle, and preferably from an arm-bed truck.

BACKGROUND

Arm-bed trucks (bale bed trucks) are work trucks frequently used in the agricultural industry named for the specialized truck beds installed thereon. Generally, "arm-bed" refers to a particular type of flat bed (i.e. no side walls on the bed) with powered (usually hydraulic) arms disposed on or adjacent to the bed, often at the rear of the bed. Arm-bed trucks are especially useful in, and specifically designed for, hauling bales of grasses or hay. Round bales can be particularly arduous to haul, usually weighing well over one thousand pounds (often over a ton). To facilitate the lifting, hauling, and laying of one or more round bales (or other bales) on or from the truck, one or more hay spikes can be disposed on the ends of the arms to enable penetration of the bales by the arms, ultimately allowing the arms to firmly and securely grip a bale. Other attachments can also be used on or in conjunction with the arms and bed, such as corrugated discs, feeders, reel lifts, winders, square bale handlers, post hole diggers, and dump boxes. Arm-beds can be very expensive, with just the arm-bed (no truck attached) costing thousands of dollars, with notable brands including HydraBed®, DewEze®, Butler Beds®.

Like arm-beds or arm-bed trucks, other types of specialized mobile equipment in the agricultural industry include agricultural sprayers. These sprayers are often disposed on tractors or specialized trucks and are used to disperse liquid over large areas. Some sprayers are dedicated motorized vehicles, some can be installed on tractors, and some take the form of trailers that can be attached to commercially-available trailer hitches.

As discussed above, vehicles such as arm-bed trucks and agricultural sprayers are often specific for and dedicated to a set task; sprayers are not used to haul hay, and arm-beds are not used to disperse fluid. However, such vehicles can require a significant investment up front, as well as additional maintenance and upkeep over the life of the vehicle. As such, it can be cost-prohibitive for participants in the agricultural industry to be required to purchase dedicated equipment (especially dedicated vehicles) for every task that needs to be performed in almost any given day.

SUMMARY

The present disclosure offers advantages as a mobile liquid dispersion system and apparatus operable to connect with an arm-bed truck. In one embodiment, the present disclosure includes a liquid dispersion system. The system can comprise a spray rig and a tank carrier. The spray rig can comprise a sleeve configured to engage an arm of an arm-bed truck, and a first spray boom engaged with the sleeve. The tank carrier can comprise a receptacle, an angle iron, and a boom rest configured to receive the first spray boom.

In another embodiment, the present disclosure includes a liquid dispersion apparatus that can comprise a spray rig. The spray rig can comprise a sleeve configured to engage an arm of an arm-bed truck, and a spray boom hingedly engaged with the sleeve. In another embodiment, the present disclosure includes a carrier apparatus comprising a receptacle configured to receive freight; an angle iron adapted to engage a portion of a bed of an arm-bed truck; and a receiver configured to receive an arm of the arm-bed truck.

In another embodiment, the present disclosure includes a method of dispersing liquid from an arm-bed truck. The method can comprise the steps of engaging an arm of the arm-bed truck with a tank carrier; lifting the tank carrier onto a bed of the arm-bed truck; engaging the arm of the arm-bed truck with a spray rig; and dispersing a liquid of the tank carrier from a nozzle on the spray rig.

The present disclosure offers advantages as a system for use with an arm-bed truck. The present disclosure can obviate the need to purchase, for example, a dedicated mobile liquid dispersion device, such as a large truck or other heavy equipment dedicated to liquid application like those used in the agricultural industry. Instead, in one embodiment, the present disclosure provides a system that can be adapted to an arm-bed truck that is otherwise generally used to, for example, haul hay.

The present disclosure additionally offers advantages as a carrier that can be utilized with arm-bed trucks known in the art. For example, in one embodiment, the present disclosure provides a carrier that can contain any desired freight and facilitate the loading and securing of such freight on an arm-bed truck via the arms of the truck.

In another embodiment, the present disclosure provides a novel method of mobile liquid dispersion from an arm-bed truck, wherein the method includes a carrier that enables the loading and securing of a fluid tank on the truck, as well as a spray rig that can engage the arms and disperse fluid therefrom.

DETAILED DESCRIPTION OF THE INVENTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

Figure 1:
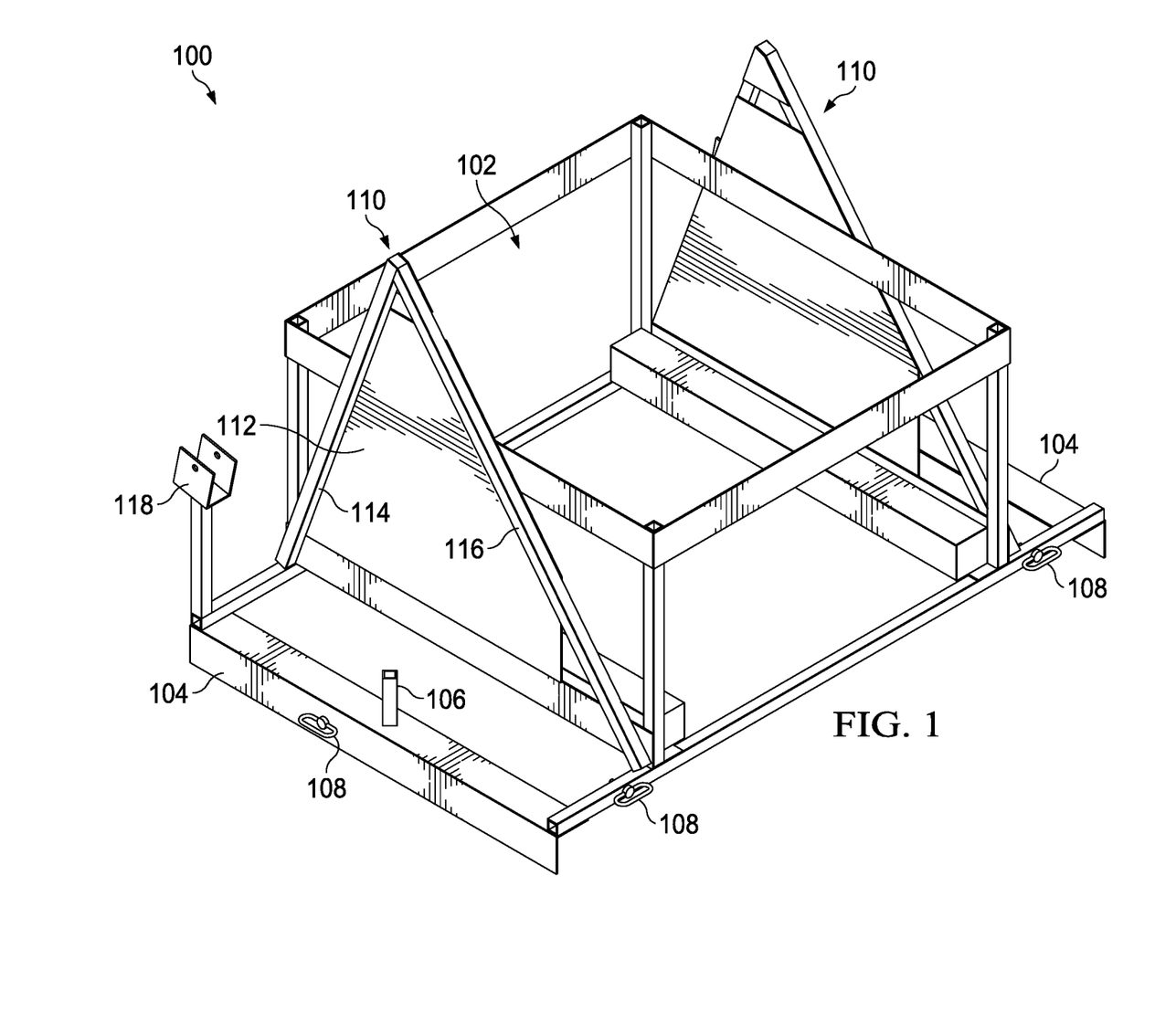
FIG. 1 illustrates a carrier (tank carrier) as an exemplary embodiment of the present disclosure, wherein the carrier can include a receptacle, receiver members, and an angle iron.

FIG. 1 depicts an exemplary embodiment of the present disclosure. A carrier (tank carrier) 100 can include a receptacle 102 for containing, in one example, a liquid tank, such as an intermediate bulk container ("IBC"), or any other suitable liquid tank. In another embodiment, the receptacle 102 can be configured to contain any myriad of suitable freight, such as grain, gravel, feed, or any other freight desired to be hauled in the carrier 100. For example, the receptacle 102 can be a solid container, such that sand or liquid can be contained without leakage; in another example, the receptacle 102 can be a frame to support a liquid tank such as an IBC tank. In another example, the receptacle 102 can itself be a liquid tank that can be filled, emptied, and reused. The receptacle 102 can be coupled to an angle iron 104 or angle irons 104. In another embodiment, a different structural element can be used instead of an angle iron, such as a rail, bar, stud, or any other component suitable to facilitate coupling of the receptacle 102 and/or carrier 100 to, for example, the bed of an arm-bed truck. In one embodiment, the angle iron 104 can facilitate the securing of the tank carrier 100 to, for example, a flat-bed truck, or the bed of an arm-bed truck. The angle iron 104 can have a handle 106 to facilitate gripping of the carrier 100, and there can further be a pin 108 or pins 108 disposed on the angle iron 104 and/or receptacle 102 to enable the removable securing of the carrier 100 to, for example, an arm-bed truck. The carrier 100 can also include a boom rest 118 configured to receive a spray boom in accordance with the present disclosure.

In one embodiment, the carrier 100 can include a receiver(s) 110 configured to facilitate the hoisting of the carrier 100 by arms of an arm-bed truck. In one example, the receiver 110 can have a first and second receiver member 110, wherein each receiver member 110 can be configured to receive and engage an arm of an arm-bed truck. For example, a receiver member 110 can include a plate 112 and guide rails 114, 116 to facilitate the removable coupling of an arm of an arm-bed truck, such that the arms can hoist the carrier 100. In one embodiment, the plate 112 can be a side of the receptacle 102, or a stand-alone structure. In one embodiment, and as an example, the carrier 100 can be disposed on the ground, and the arms of the arm-bed truck, with or without hay spikes (i.e. tubes or spikes known in the art to enable the hoisting of, for example, bales of hay) or other suitable attachment, can be lowered to clamp the carrier 100 within the receiver members (receiver) 110, such that the spikes contact the plates 112. As the arms are raised, the guide rails 114, 116 guide the spikes to, in this example, the vertex of the guide rails 114, 116, such that the carrier 100 is removably engaged with the arms of the arm-bed truck. In one embodiment, the receiver member 110 can be shaped, as a triangle, with the guide rails 114, 116 providing two sides of the shape and forming a point. In this manner, as the arms are raised, the guide rails 114, 116 can guide the arms to engage the point of the triangle. In another embodiment, the guide rails 114, 116 can be disposed on the carrier 100 such that a side of the triangle formed therebetween can be as wide as the receptacle 102, and in this manner, can enable the arms to have the largest possible area for engaging the receiver 110. In another embodiment, the area of the triangle formed by the guide rails 114, 116 can be between 250 and 1500 square inches. In another embodiment, the hypotenuse of the triangle formed by the guide rails 114, 116 can be between 12 and 144 inches.

In another embodiment, the receiver can include a receiving area which can comprise the space in which the arm of an arm-bed truck can engage the carrier. For example, and in one embodiment, the receiving area can comprise the area between the guide rails 114, 116. The receiving area, in another embodiment, can be defined by the plate 112. In another embodiment, the receiving area can be configured to snugly engage an arm or arm attachment (i.e. disk, spike, etc.); in another embodiment, the receiving area can be configured to initially very loosely engage an arm or arm attachment and gradually engage the arm or attachment more tightly as the arm is lifted. As an example, the receiving area can loosely engage a hay spike at the bottom of the triangle formed by the guide rails 114, 116, and as the arm is lifted, the spike can become snugly engaged at the hoist point.

Such design can be advantageous in that the arms can engage the receiver members 110 without being perfectly aligned, for example, with notches to receive the arms; instead, the arms can engage the carrier 100 anywhere within the area of the receiver member 110, and the guide rails 114, 116 can guide the arms to the hoist point (i.e. the upper vertex of the triangle formed at the juncture of the guide rails 114, 116) to enable the arms to hoist the carrier 100. For example, in one embodiment, the receiver members 110 can enable an operator of the truck to have a larger margin of error with respect to engaging the arms with the carrier 100; as long as the arms clinch the carrier 100 within the area between the guide rails 114, 116, the guide rails 114, 116 can direct the arms to the hoist point as the arms are lifted to hoist the carrier 100. The shape of the receiver members 110 can be any suitable shape, including semi-circular, rectangular, octagonal, or any other shape. Preferably, the shape of the receiver members 110 (which can be determined by the guide rail(s) 114, 116) can facilitate the guiding of the arms to the hoisting point to better enable an operator of the arm-bed truck to hoist the carrier 100 without precise aiming of the arms.

In another embodiment, the hoist point(s) of the receiver 110 or receiver member 110 can be positioned on the carrier 100 such that the carrier 100 and contained load in the receptacle 102 can be balanced on the hoist point(s). In this manner, the receptacle can 102 be of any suitable size to, for example, fit on the bed of an arm-bed truck, and the receiver 110 or receiver members 110 can be positioned on the carrier 100 in any suitable manner to allow an arm or arms of an arm-bed truck to engage and lift the carrier 100. For example, a receiver 110 could be positioned at a central location above the receptacle 102 and be configured to receive an arm or arms. In another example, the receiver 110 could be detachable from the receptacle, such that the receiver 110 could be removed to facilitate loading of the receptacle 102 and then reattached to facilitate loading of the carrier 100 on the bed. In one embodiment, the receptacle 102 can be the entire length of a bed of an arm-bed truck, and the receiver 110 can be positioned to allow the truck to lift of the carrier 100 onto the bed.

Figure 2A:
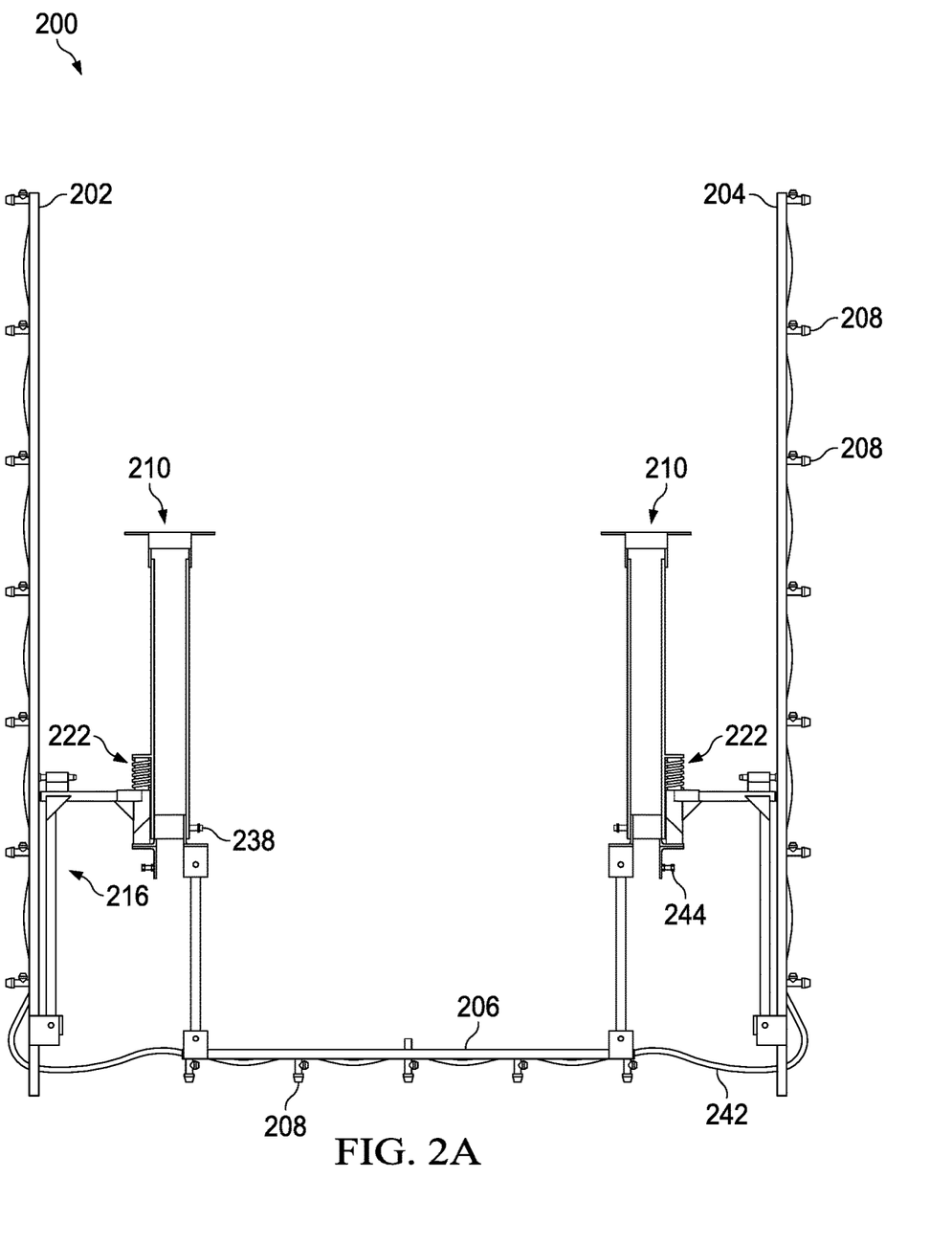
FIGS. 2A and 2B illustrate a spray rig and an exploded view of a spray rig as exemplary embodiments of the present disclosure, wherein the spray rig can include a sleeve and a spray boom.

FIG. 2A depicts another embodiment of the present disclosure. A liquid dispersion apparatus can include a spray rig 200 that can include two side booms 202, 204 and a bottom boom 206 (spray booms). In one example, a spray boom can include any component capable of spraying or dispersing a fluid therefrom; in another example, a spray rig can include any component capable of dispersing a solid, such as grain, gravel, or any other suitable solid. Preferably, and in one embodiment, a "spray boom" can include a pipe or tube with hosing plumbed throughout and connected to at least one nozzle to facilitate the spraying of fluid from the spray boom. The spray booms 202, 204, 205 can each include a nozzle 208 or a plurality of nozzles 208 configured to disperse liquid provided via tubing 242 of the booms 202, 204, 206. In one embodiment, the spray booms 202, 204, 206 can be coupled to a pair of sleeves 210 configured to receive arms of an arm-bed truck. The sleeves 210 can include securing mechanisms 238, 244 to secure and/or engage the spray rig 200 to the arms. In one example, the securing mechanisms 238, 244 can be set screws, wherein set screw 244 can exert pressure on the arm, and set screw 238 can extend laterally across the arm to another side of the sleeve 210, such that the arm is prevented from falling out of the sleeve 210. In another example, the sleeve 210 can be secured via other tightening mechanisms, such as straps, chains, winches, cables, latches, or any other mechanism suitable to removably and securely attach the sleeve 210 to an arm of an arm-bed truck. In one example, the side booms 202, 204 can be connected to the sleeves 210 via boom adapters 216. The boom adapters 216 can be engaged with the sleeves 210 via a hinge 222. Preferably, the hinge 222 is a compression hinge 222.

Figure 2B:
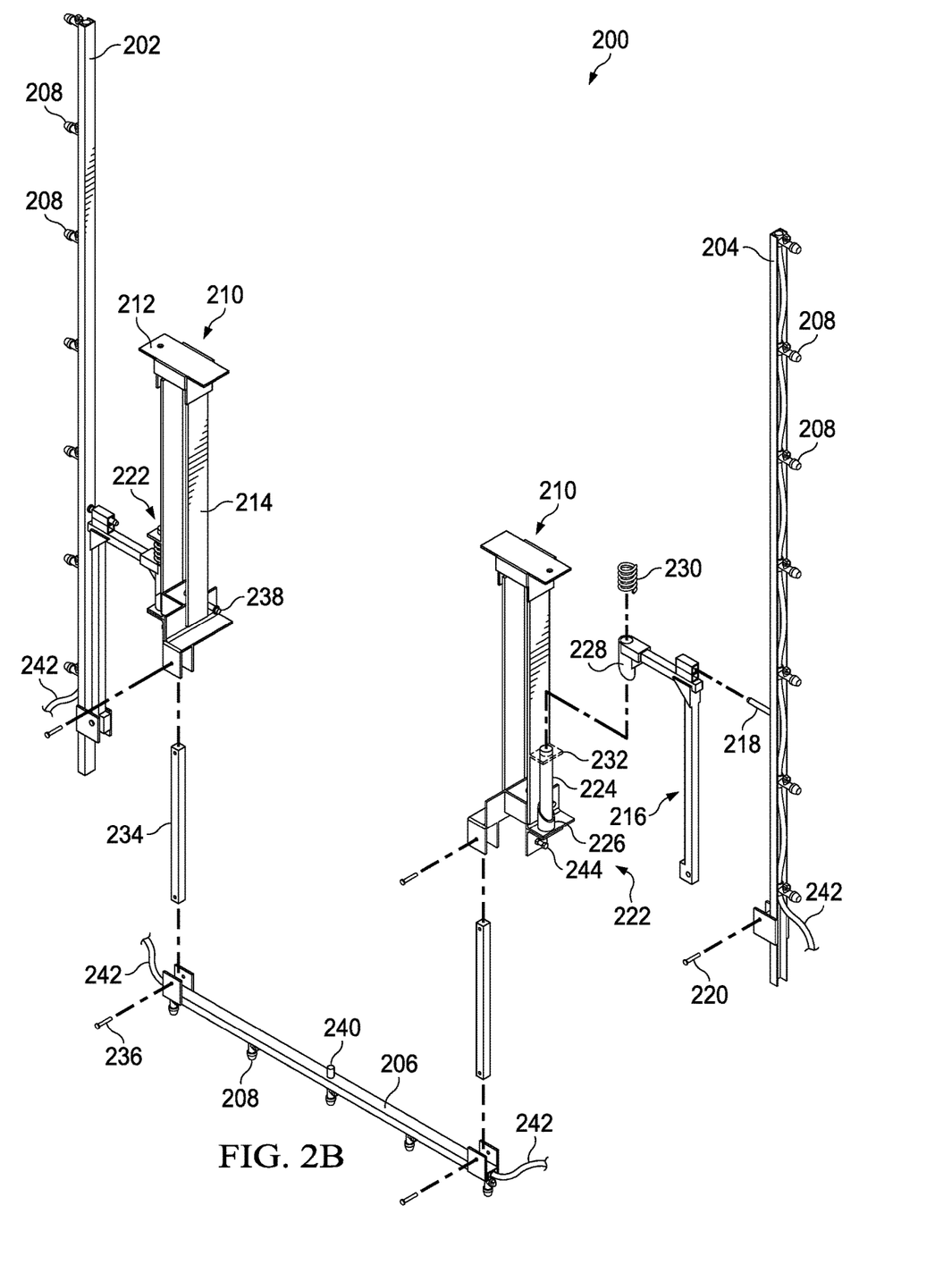

FIG. 2B depicts an exploded view of one embodiment of the spray rig 200 shown in FIG. 2A. The sleeves 210 can each include a sleeve cap 212 and sleeve body 214. The sleeve cap 212 can be configured to receive and cap an end of an arm of an arm-bed truck. The sleeve body 214 can be configured to conform to a length of the arm and "hug" the arm to secure the rig 200 to the arm(s). The boom adapter 216 can be configured to hingedly engage both the sleeve 210 and the boom 204. For example, a pin 220 can hingedly secure the boom 204 to the adapter 216, such that the boom 204 can rotate around the pin 220 while remaining secured to the adapter 216. The adapter 216 can also be configured to receive a rod 218 of the boom 204, and when the rod 218 is inserted through the adapter 216, a pin (not shown) or other suitable mechanism can be used to secure the boom 204 to the adapter 216 in an upright position. Preferably, the adapter 216 can also be hingedly engaged with the sleeve 210. Preferably, hinged engagement of the spray boom 204 with the sleeve 210 (such as via the hinge 222 and pin 220) can enable the boom 204 to rotate in two planes of movement, i.e. in the y plane and the z plane. In one embodiment, movement around the longitudinal axis of the hinge 222 can be considered movement in the y plane, and movement around the pin 220 can be considered movement in the z plane. In another embodiment, the boom 204 can additionally be moved in a third plane (i.e. the x plane), via extensions, additional hinges, motors, or any other mechanism suitable to facilitate the movement of the boom 204 in the x plane.

In one example, the hinge 222 can be a compression hinge 222. A pin 224 can be disposed on the sleeve 210 with a slanted cylindrical wedge 226 disposed at the bottom of the pin 224. An eye of the adapter 228 can be configured to receive the pin 224, and the eye 228 can be configured with a corresponding slanted cylindrical wedge as a counterpart to the wedge 226 on the sleeve 210. A spring 230 can be disposed over the pin 224 and compressed between a compression plate 232 and the adapter 216, exerting a downward pressure against the adapter 216. In this manner, as the adapter 216 and attached boom 204 are rotated around the hinge 222, the eye 228 is forced to travel up the pin 224 via the interaction between the eye 228 and the wedge 226, further compressing the spring 230 against the compression plate 232. The downward pressure from the spring 230 can then cause the adapter 216 to eventually reposition on the hinge 222 such that the cylindrical wedge of the adapter eye 228 engages with the cylindrical wedge of the sleeve 226 at the position of least resistance.

In one embodiment, the hinge 222 can accomplish the task of allowing the adapter 216 and attached boom 204 freedom of movement around the hinge 222 while enabling the eventual and reactionary repositioning of the adapter 216 and boom 204 to the position of least resistance. In this manner, the boom 204 can be resistant to impacts by being flexible around the hinge 222, and the boom 204 will automatically reposition itself after said impact. Other mechanisms besides the compression hinge 222 discussed above can be used to accomplish this purpose. For example, the adapter 216 can be connected to the sleeve 210 via a regular hinge connected to the adapter 216 and sleeve 210 via spring-loaded leaves that facilitate post-impact repositioning. As another example, the sleeve 210, adapter 216, and boom 204 can be fabricated from flexible material (i.e. rubber, plastic, etc.) as one piece, such that the connections of the pieces are flexible in-and-of themselves to enable freedom of movement and eventual repositioning in accordance with principles of the present disclosure. As another example, the adapter 216 can be connected to the sleeve 210 via a spring loaded, one-way latch or lever, such that the adapter 216 can swing from the sleeve 210 and eventually return to a desired position. Any other suitable mechanism that allows for freedom of movement (and preferably eventual repositioning) at the point of connection between the adapter 216 or boom 204 and sleeve 210 can be used. In another embodiment, other mechanisms can be used that do not allow any freedom of movement, such that the adapter 216 or boom 204 and sleeve 210 are statically engaged.

In one embodiment, the sleeve(s) 210 can also be configured to enable attachment of a bottom boom 206. Preferably, a spray rig 200 with two sleeves 210 can be configured such that each sleeve 210 can receive attachment of a bar 234 via, for example, pins. The bars 234 can then attach via, for example, pins 236, to a bottom boom 206. Preferably, the attachment of the bars 234 to the sleeves 210 and to the bottom boom 206 can be somewhat relaxed to allow for some freedom of movement. In another embodiment, the bars 234 can be statically attached to both the bottom boom 206 and the sleeves. In another embodiment, the bottom boom 206 and bars 234 can be a single component, such that the bottom boom 206 and bars 234 can be considered collectively as a "boom." The bottom boom 206 can include a hose adapter 240 configured to receive fluid from an attached fluid source, such as, for example, an IBC tank; in another embodiment, any of or all of the booms 202, 204, 206 can comprise a hose adapter, or have a hose or hoses extending therefrom operable to connect to a pump, fluid source, or other mechanism to enable fluid flow to the booms. The spray rig 200 can contain plumbing throughout to enable the conveyance of fluid from the hose adapter 240 to a nozzle 208 or plurality of nozzles 208 disposed on the rig 200. Preferably, the rig 200 can include a hose 242 disposed within the bottom boom 206 and traveling to and through the side booms 202, 204, the hose 242 in fluid communication with the hose adapter 240. The hose 242 can be configured to deliver fluid to the myriad of nozzles 208 an all three booms 202, 204, 206; in another embodiment, each boom 202, 204, 206 can have dedicated hosing or plumbing that is operable to connect to each other boom, or to the fluid source.

Figure 3A:
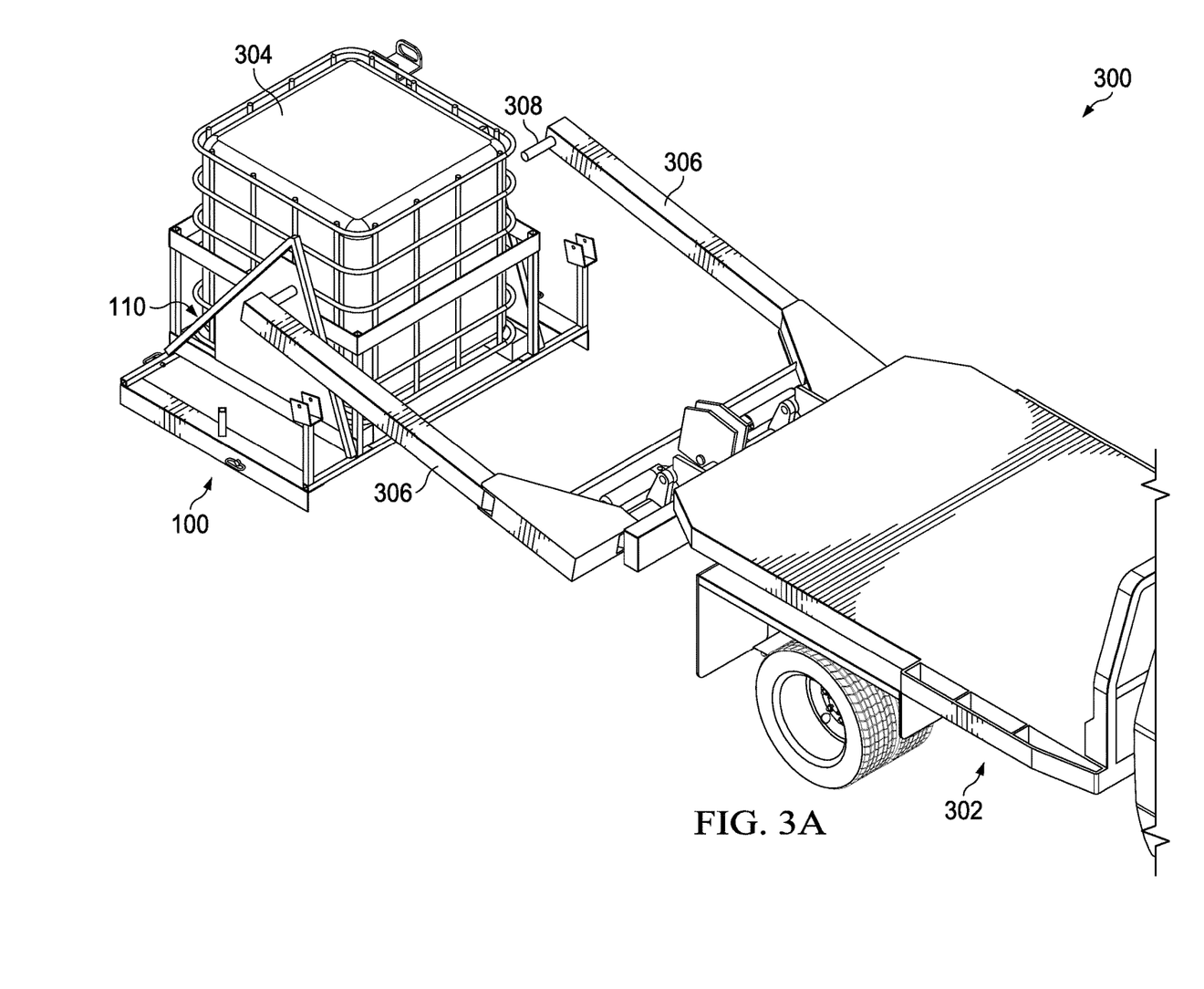
FIGS. 3A and 3B illustrate an exemplary embodiment in accordance with the present disclosure, wherein a carrier can be loaded onto an arm-bed truck via the arms of the arm-bed truck.
Figure 3B:
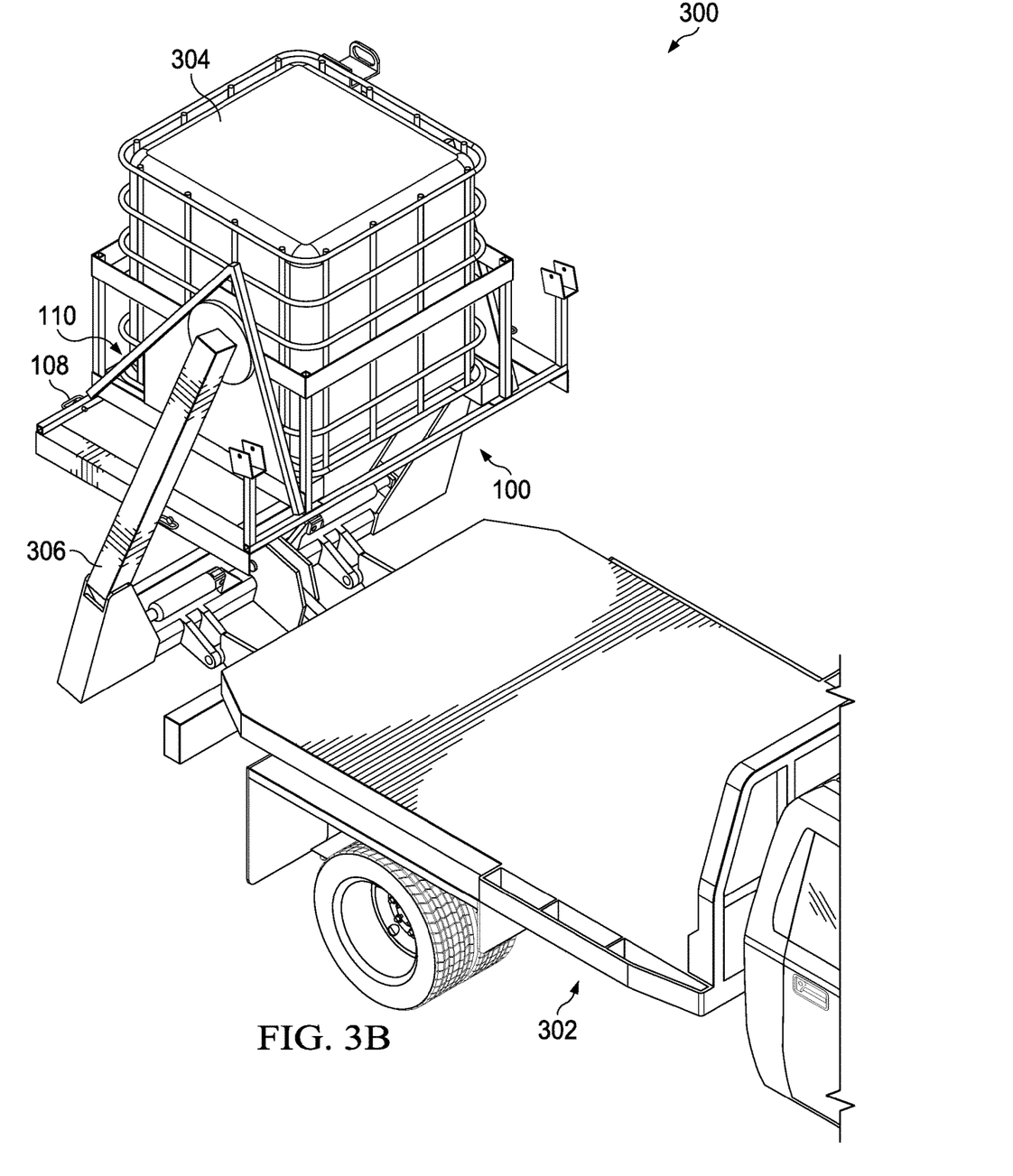

FIG. 3A depicts an embodiment of the present disclosure. A liquid dispersion system 300 can include an arm-bed truck 302 with, for example, an empty bed. A carrier (tank carrier) 100 can be disposed on the ground. Freight (in this example, an IBC tank 304) can be disposed within the carrier 100. Preferably, the arms 306 of the arm-bed truck 302 can be lowered to engage the carrier 100 at the receivers 110. In this example, the arms 306 can have hay spikes 308 (or some other suitable attachment, such as a disk, etc.) attached, and the receivers 110 of the carrier 100 can be configured to receive the spikes 308. In another example, the receivers 110 can be configured to receive different attachments for the arms 306 of the truck 302, or to receive the arms with no attachments connected. For example, the receivers 110 can be configured with loops to receive ends of the arms 306. In another embodiment, the receivers 110 can include magnets to magnetically engage the arms 306. In another embodiment, the receiver 110 can include straps affixed to the carrier 100 to enable attachment to the arms 306. Any mechanism suitable for the attachment of the arms 306 to the carrier 100 can be utilized as the receivers 110, or alternatively, the receivers 110 can incorporate any suitable mechanism of attachment that enables the arms 306 to selectively engage with and hoist the carrier 100. In one embodiment, when the arms 306 engage the receivers 110 of the carrier 100, the arms can lift the carrier 100 and contained freight 304 and load it onto the bed of the truck 302, as seen in FIG. 3B. Preferably, the carrier 100 can be designed such that, once the arms 306 are positioned as close to the truck 302 cab as possible, the carrier 100 can effectively be deposited onto the bed of the truck 302 and be in position to be secured to the truck 302 via the pins(s) 108 without further adjustment.

Figure 4A:
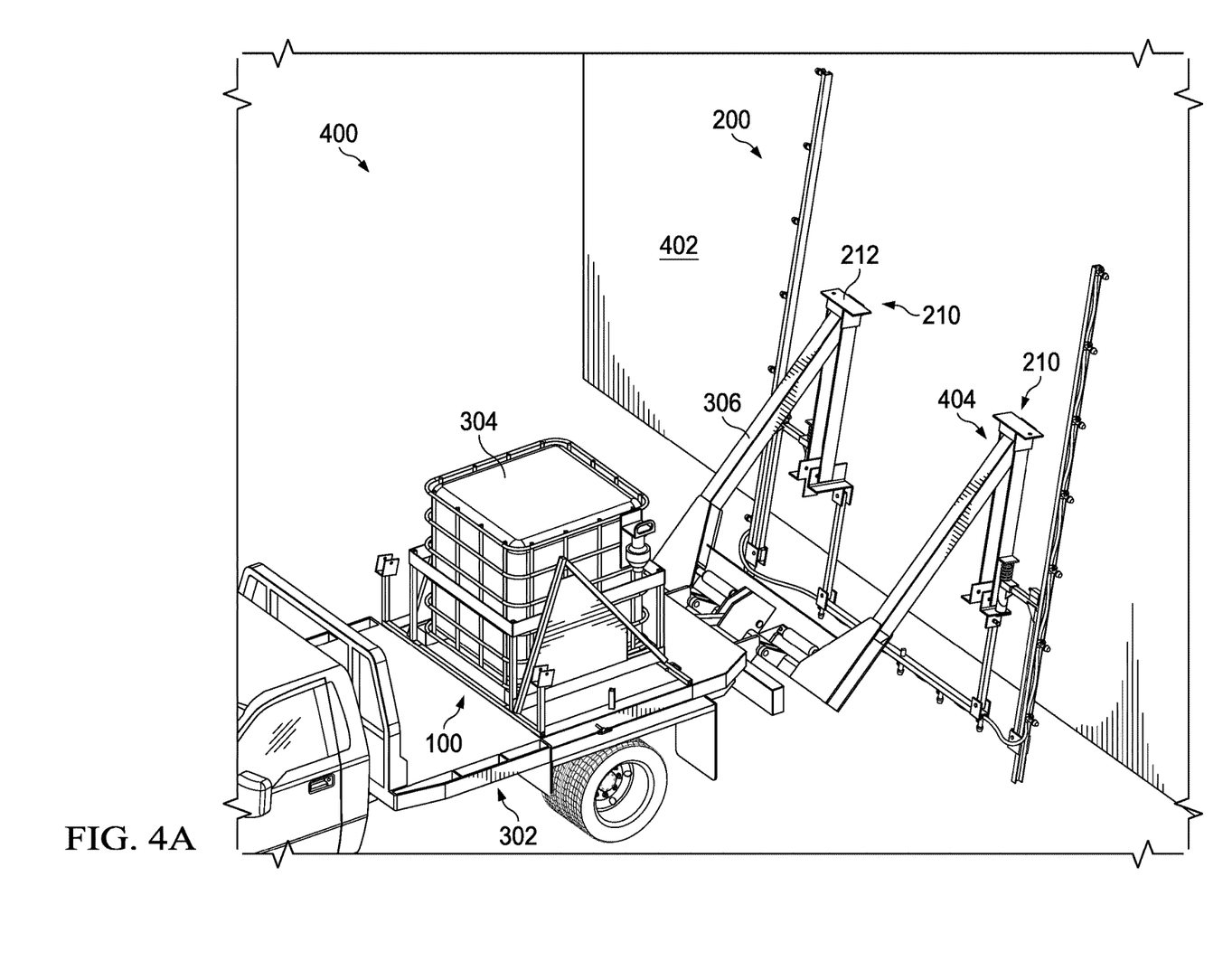
FIGS. 4A and 4B illustrate an exemplary embodiment in accordance with the present disclosure, wherein a spray rig can be engaged with arms of an arm-bed truck.
Figure 4B:
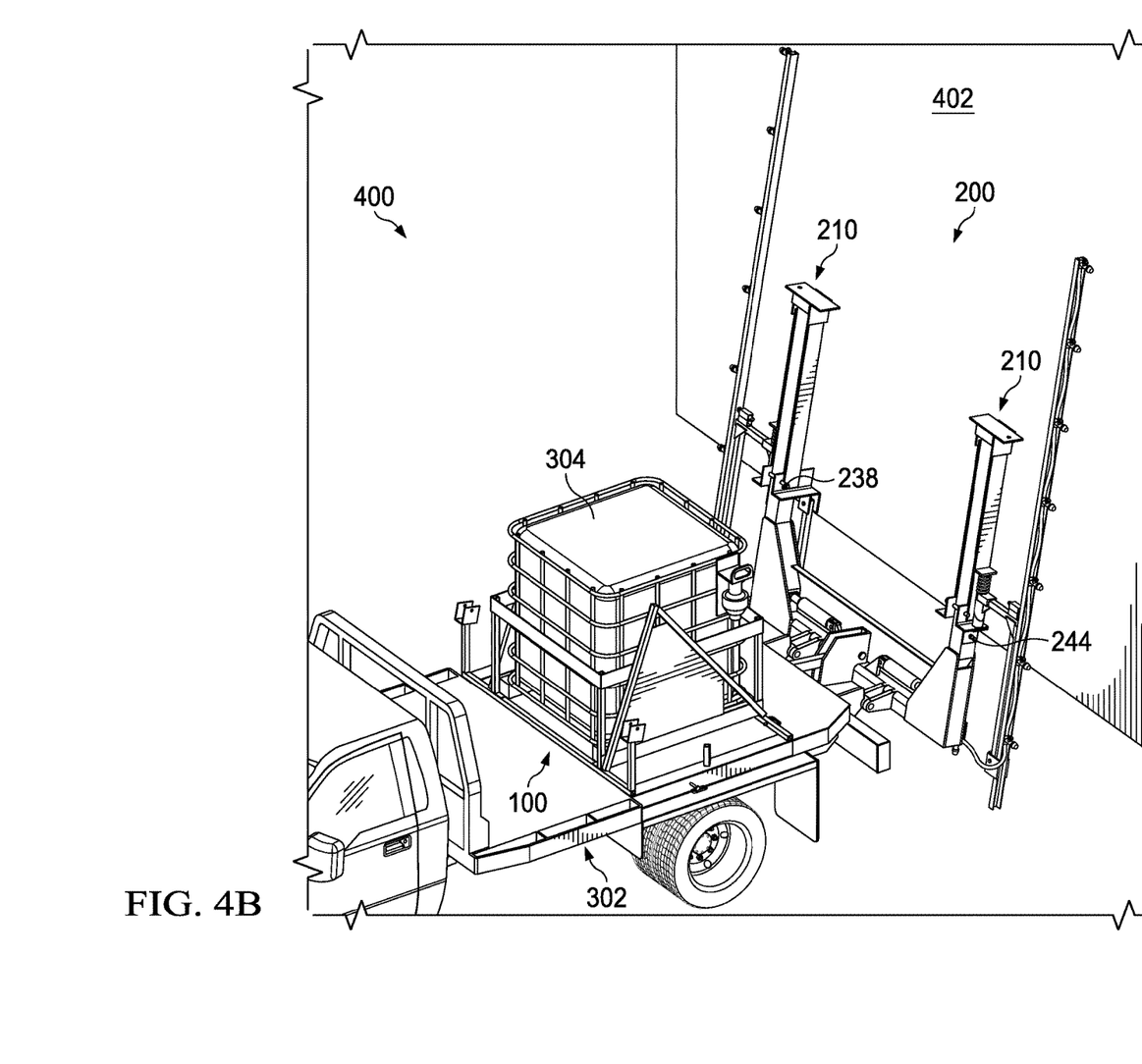

FIG. 4A depicts another embodiment of the present disclosure. A liquid dispersion system 400 can include an arm-bed truck 302 with a carrier 100 and contained freight 304 loaded thereon. A spray rig 200 in accordance with principles of the present disclosure can be positioned to facilitate engagement of the arms 306 of the arm-bed truck 302 with the spray rig 200; in one example, the spray rig 200 can be leaned against a structure 402. In another embodiment, the spray rig 200 can be capable of standing upright on its own, and in another example, the arms 306 of the arm-bed truck 302 can hoist the spray rig 200 from the ground. The spray rig 200 can be positioned in any suitable manner that would allow the arms 306 of the arm bed 302 to engage the sleeves 210 of the spray rig 200. In one embodiment, the sleeve caps 212 are configured to create an indention (not shown) that receives the ends of the arms 306, such that the sleeve caps 212 cap 404 the arms 306. In one example, the sleeve cap 212 includes a receiving area with a lip to securely receive an end of an arm 306, such that the spray rig 200 does not slip off of the arm 306 while the rig 200 is being lifted. In one embodiment, this capping 404 of the arms 306 enables the arms 306 to lift the spray rig 200 from the ground and be installed or engaged on the arms 306, as seen in FIG. 4B. Such installation or engagement, in one embodiment, can be accomplished via a myriad of pins and set screws. For example, a pin 238 can traverse the thickness of the sleeve 210 and lock the arm 306 within the sleeve 210, such that a bottom portion of the arm 306 cannot exit the sleeve 210 while the pin 238 is in place. In one embodiment, while the pin 238 can ensure that the arm 306 cannot exit the sleeve 210, the pin 238 can still allow the arm 306 to move around somewhat within the sleeve 210 (such freedom of movement can be a result of sizing the sleeve 210 to loosely lit the arm 306 to enable easier engagement of the sleeve 210 with the arm 306). In one example, a set screw 244 on the sleeve 210 can be tightened and compressed against the side of the arm 306, such that the sleeve 210 and spray rig 200 are securely fixed on the arms 306 of the truck 302.

Figure 5A:
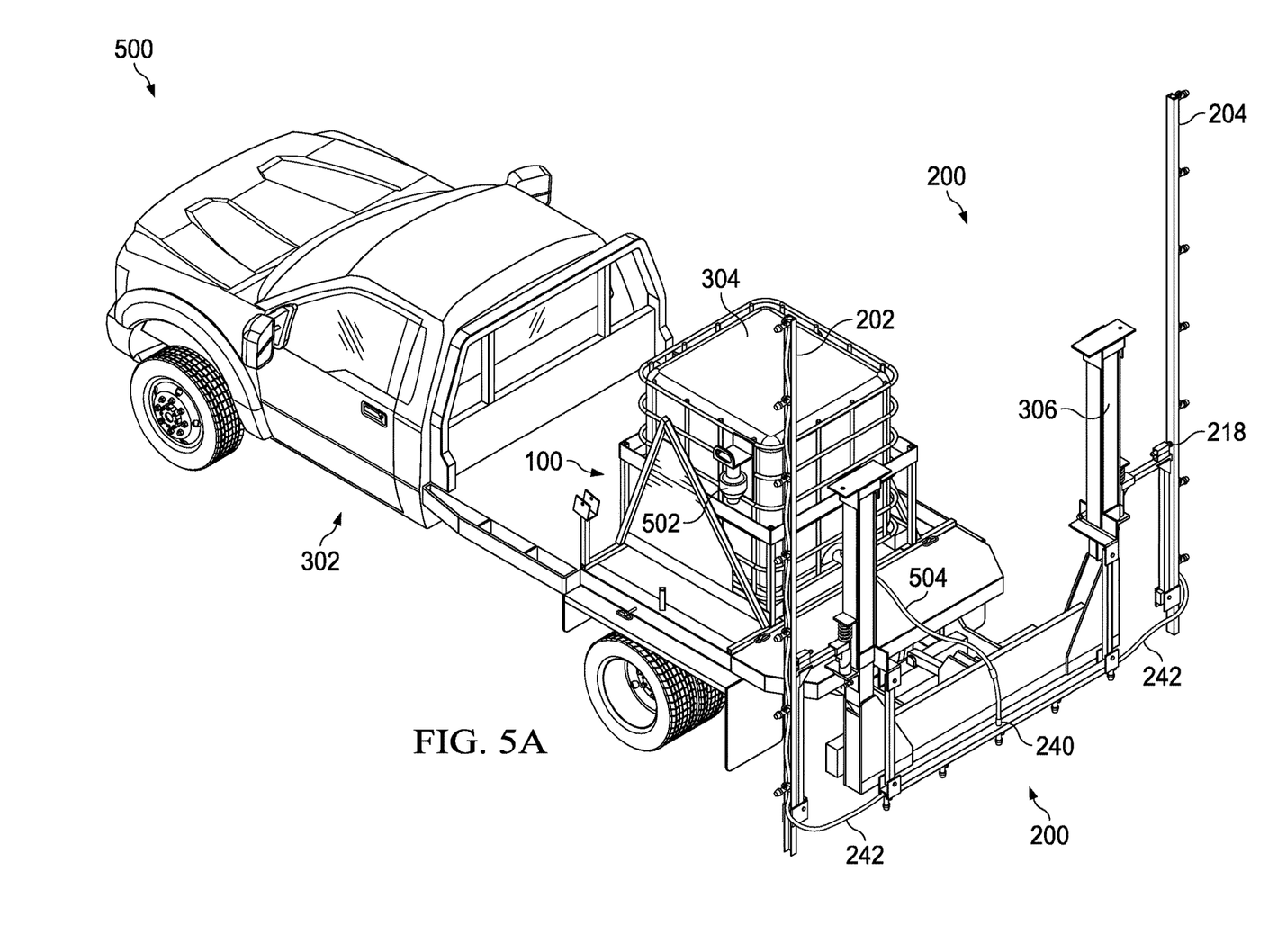
FIGS. 5A, 5B, and 5C illustrate an exemplary embodiment in accordance with the present disclosure, wherein a spray rig engaged with an arm-bed truck can be fixed in multiple configurations.

FIG. 5A depicts another embodiment of the present disclosure. A liquid dispersion apparatus 500 can include a carrier 100 and contained freight 304 and a spray rig 200. In one embodiment, the apparatus 500 can be installed on an arm-bed truck 302, such that the carrier 100 is secured to the bed of the truck 302 and the spray rig 200 is installed on the arms 306 in accordance with principles of the present disclosure. In one embodiment, the freight 304 can be an IBC tank filled with any type of liquid. A spray rig 200 can include a hose adapter 240 and tubing 242 throughout to facilitate transport of liquid throughout the rig 200. A pump 502 can be installed to facilitate fluid communication between the tank 304 and rig 200, which can be accomplished via a hose 504 connecting the tank 304 to the rig 200. In one embodiment, and as seen in FIG. 5A, the side booms 202, 204 can be locked in place via a rod 218 and pin (not shown), such that the booms 202, 204 are maintained at an angle parallel with the arms 306 of the truck 302. Such configuration can be advantageous if, for example, the rig 200 is to be put in storage or prepared for installation on the arms 306 of the truck 302.

Figure 5B:
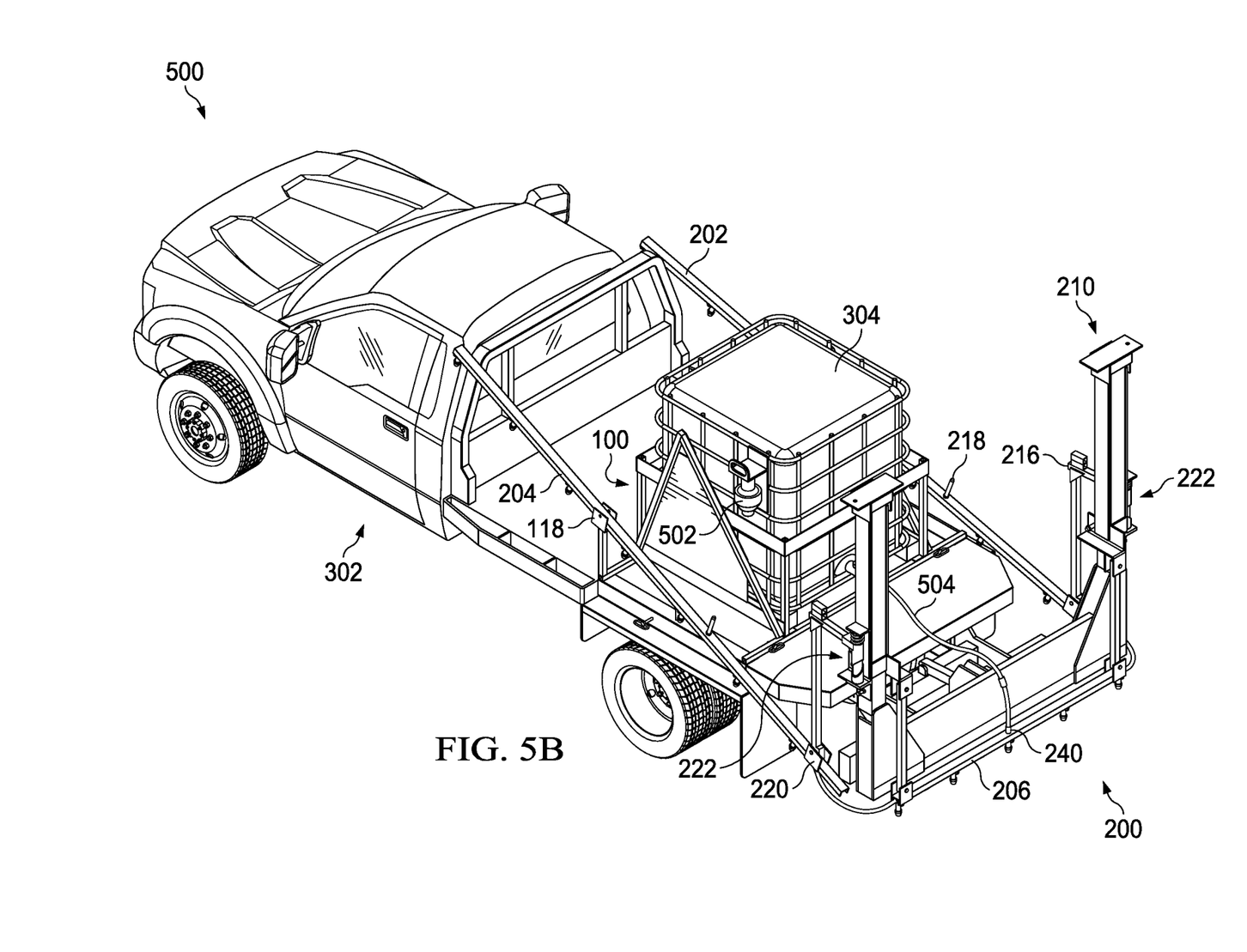

As another embodiment, FIG. 5B depicts the side booms 202, 204 of the liquid dispersion apparatus 500 mounted within the boom rests 118 of the carrier 100 while the apparatus 500 is installed on a truck 302. In this embodiment, the hinge(s) 222 disposed between the boom adapter(s) 216 and the sleeve(s) 210 facilitates needed movement of the boom(s) 202, 204 relative to the longitudinal axis of the truck 302, such that the booms 202, 204 can be angled to be mounted within the boom rests 118 of the carrier 100. In one embodiment, hinge functionality enabled by the pins 220 connecting the booms 202, 204 to the boom adapters 216 enables the booms 202, 204 to rotate around the axes of the pins 220, such that the booms 202, 204 can be raised and lowered when the rods 218 of the booms 202, 204 are not engaged within the adapters 216. Such mounting of the booms 202, 204 within the boom rests 218 can be advantageous, for example, when the truck 302 is travelling down a highway, or when the profile of the apparatus 500 needs to be minimized for parking, driving, or storage.

Figure 5C:
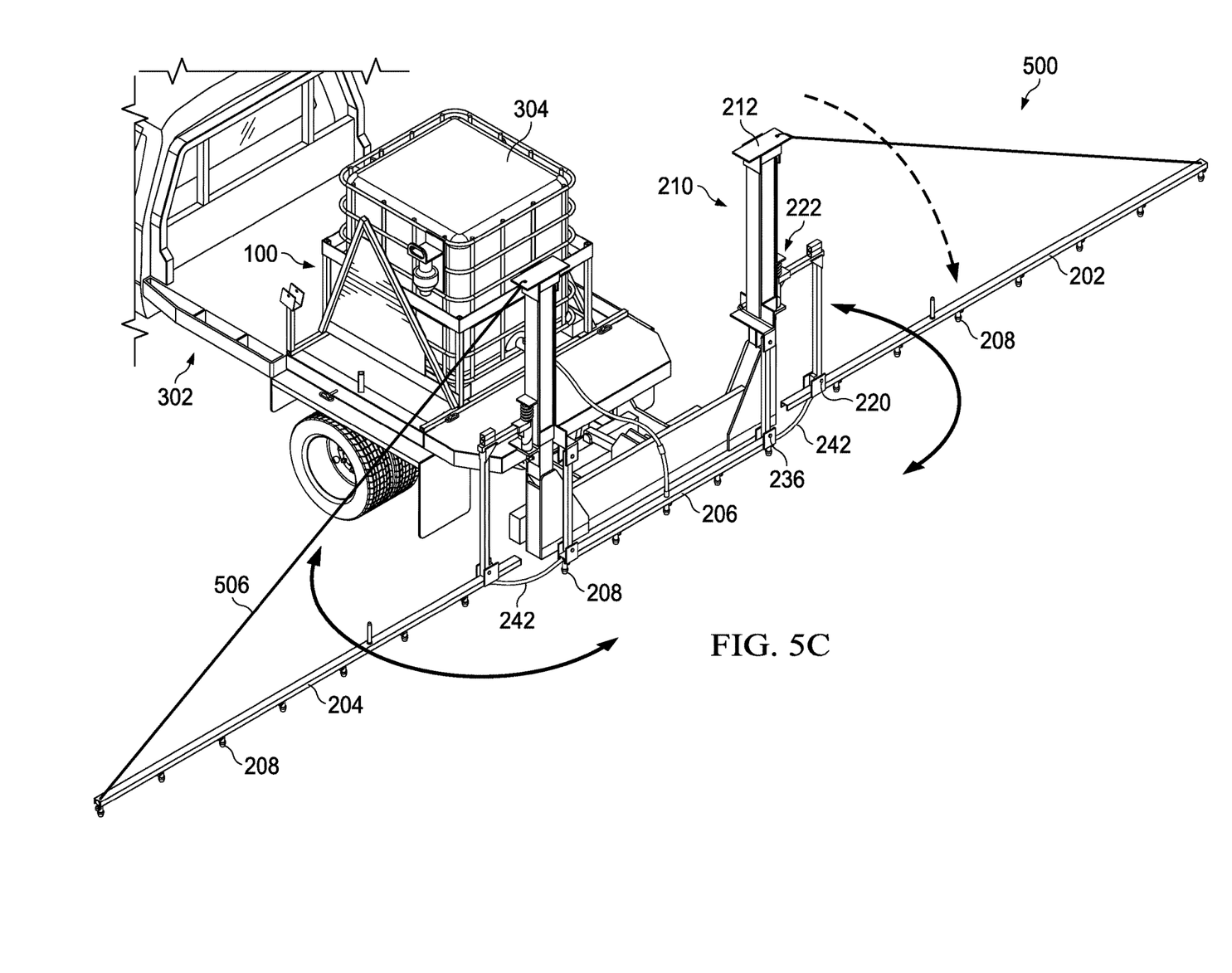

FIG. 5C depicts another embodiment of a liquid dispersion system 500 according to the principles of the present disclosure. In one embodiment, the side booms 202, 204 can be rotated about the pins 220 connecting the booms 202, 204 to the boom adapters 216 to position the booms 202, 204 at an appropriate level to disperse liquid onto, for example, the ground. In another embodiment, the booms 202, 204 can be maintained in a position via, for example, the mechanical attachment between the adapters 216 and booms 202, 204; for example, the booms 202, 204 and adapters 216 can be connected such that the booms 202, 204 will not rotate beyond a 90 degree angle relative to the adapters 216. In one embodiment, cables 506 can be affixed to the ends of the booms 202, 204 and to the sleeve caps 212 to prevent the booms 202, 204 from traveling beyond a desired angle. In another embodiment, the pins 220 or hinges 220 themselves prevent the booms 202, 204 to travel beyond a desired angle. Any other suitable mechanism can be used to connect the booms 202, 204 to the adapters 216 and facilitate the maintaining of the booms in a particular position. For example, the pins 220 can be hinges configured to prevent rotation beyond a certain degree. In another embodiment, the cables 506 can be connected to one or more winches, to enable a driver of the truck 302 to control the position of the booms from the cab of the truck 302. In one embodiment, the hinges 222 connecting the adapters 216 to the sleeves 210 can enable the movement of the booms 202, 204 and adapters 216 about the axes of the hinges 222, as depicted in FIG. 5C, in accordance with the principles of the present disclosure. In one example, the booms 202, 204 can be maintained in substantially the same plane as the bottom boom 206, such that liquid is dispersed from all three booms 202, 204, 206 at substantially equivalent heights.

Figure 6:
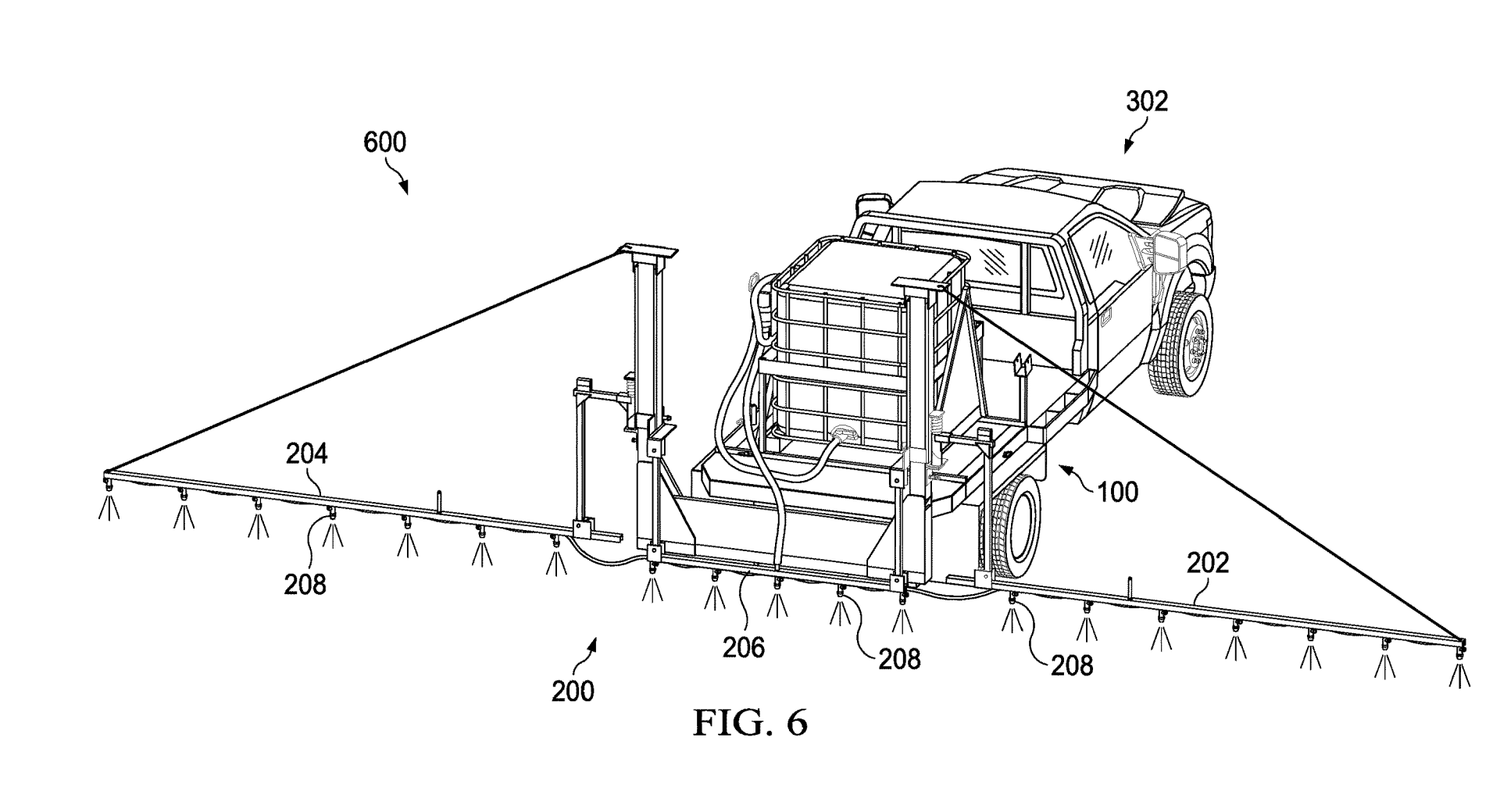
FIG. 6 illustrates an exemplary embodiment in accordance with the present disclosure, wherein liquid can be dispersed from a mobile perform.

FIG. 6 depicts an embodiment of the present disclosure. A method of liquid dispersion 600 can include an arm-bed truck 302 with a carrier 100 loaded thereon with a liquid supply contained therein. A spray rig 200 can be installed on the arms of the truck 302 and positioned to disperse liquid from the plurality of nozzles 208 disposed on the booms 202, 204, 206. Such a method 600 can be advantageous in the dispersion of liquid from a moving platform, such as in agricultural applications, including irrigation, fertilizing, and pesticide application.

In one embodiment, the spray rig 200 and carrier 100 can be made of iron, steel, copper, aluminum, plastic, or any other material suitable for the purposes described herein. In another embodiment, the spray rig 200 can include only one spray boom or many, and in another embodiment, the spray rig 200 can include only one sleeve 210, such that the spray rig 200 is only engaged, for example, with one arm of an arm-bed truck. In another embodiment, a spray boom 202, 204, 206 can be directly engaged with the sleeve 210 without assistance from a boom adapter 216, such that the boom 202, 204, 206 is directly (preferably hingedly) engaged with the sleeve 210. In one example, a spray boom and adapter can be one piece, such that the boom and the adapter are together considered the "boom." The movement of the booms 202, 204, 206 of the apparatus 500, and of the apparatus 500 itself, can be accomplished through any suitable mechanism. For example, movement of the apparatus can occur manually (i.e. via force applied by a user or object) or remotely (such as via electric motors disposed on the apparatus and operable to respond to signals from, for example, a remote control located in the cab of the truck). In another embodiment, the system 400 or apparatus 500 can receive electricity from an outlet of the truck 302 to facilitate movement via, for example, the electric motors discussed above. In another embodiment, the system 400 or apparatus 500 can be connected to the existing hydraulics of the arm-bed truck 302 that facilitates movement of the arms 306, such that the booms 202, 204, 206 of the system 400 or apparatus 500 are hydraulically operated.

In another embodiment, the spray booms 202, 204, 206 can be operable to elongate as needed. For example, the side booms 202, 204 can each include another section with another plurality of nozzles, and the second section can fold onto the first section of the boom. In one embodiment, the tube 242 can travel the length of both sections of the boom. The sections of the spray boom can be connected, for example, via a hinge, and the boom can be made operable to prevent the flow of fluid from the first section to the second section when the second section is folded onto the first section. In another embodiment, boom rest 118 of the carrier 100 can be configured to receive the folded boom, i.e. the first and second sections of a sectioned boom.

The present disclosure achieves at least the following advantages:

1. A liquid dispersion system that can be removably installed on a mobile platform, such as an arm-bed truck;
2. A carrier operable to enable loading of freight onto an arm-bed truck via the arms of an arm-bed truck;
3. A spray rig operable to disperse liquid from an arm-bed truck;
4. A method that enables an arm bed truck to be used for fluid dispersion and application;
5. A spray rig with booms flexible to impact to mitigate potential damage to the booms or rig from said impact;
6. A modular and mobile spray rig operable to reposition before and after installation to enable multiple configurations for travel, storage, and use; and
7. A liquid dispersion system capable of repositioning into multiple configurations to meet an instant need (i.e. application, storage, high-speed travel, etc.).

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What can be claimed is:

1. A liquid dispersion system, the system comprising:
   a spray rig comprising:
     a first sleeve configured to engage a first arm of an arm-bed truck;
     a second sleeve configured to engage a second arm of the arm-bed truck;
     a first spray boom engaged with the first sleeve; and
     a second spray boom engaged with the second sleeve; and
   a tank carrier comprising:
     a receptacle;
     a first boom rest configured to receive the first spray boom; and
     a second boom rest configured to receive the second spray boom.

2. The system of claim 1, wherein the tank carrier comprises a liquid in fluid communication with the spray rig.

3. The system of claim 1, wherein the tank carrier further comprises a receiver configured to engage at least the first arm of the arm-bed truck.

4. The system of claim 1, wherein the tank carrier further comprises an angle iron configured to engage at least a portion of a bed of the arm-bed truck.

5. The system of claim 1, wherein the first spray boom is hingedly engaged with the first sleeve and the second spray boom is hingedly engaged with the second sleeve.

6. The system of claim 5, wherein the first and second spray booms are hingedly engaged with the first and second sleeves, respectively, via compression hinges.

7. The system of claim 1, wherein a first boom adapter facilitates engagement of the first spray boom with the first sleeve, and a second boom adapter facilitates engagement of the second spray boom with the second sleeve.

8. The system of claim 1, wherein the spray rig comprises a third spray boom.

9. An apparatus comprising a carrier, wherein the carrier comprises:
   a receptacle configured to receive freight;
   an angle iron adapted to engage a portion of a bed of an arm-bed truck; and
   a receiver configured to receive an arm of the arm-bed truck; wherein the receiver comprises a first receiver member and second receiver member, each of the first and second receiver members comprising a plate and a guide rail.

10. The apparatus of claim 9, wherein the guide rails form a triangle, the hypotenuse of the triangle being at least 12 inches long.

11. The apparatus of claim 9, further comprising a spray rig configured to engage the arm of the arm-bed truck.

12. A liquid dispersion apparatus comprising a spray rig, wherein the spray rig comprises:
   a first sleeve configured to engage a first arm of an arm-bed truck;
   a second sleeve configured to engage a second arm of the arm-bed truck;
   a first spray boom hingedly engaged with the first sleeve; and
   a second spray boom hingedly engaged with the second sleeve; wherein a first boom adapter facilitates engagement of the first spray boom with the first sleeve, and a second boom adapter facilitates engagement of the second spray boom with the second sleeve.

13. The apparatus of claim 12, further comprising a tank carrier comprising a first boom rest configured to receive the first spray boom, and a second boom rest configured to receive the second spray boom.

14. The apparatus of claim 12, wherein the first and second spray booms are operable to rotate in at least two planes of movement via the hinged engagement with the first and second sleeves.

15. A method of dispersing liquid from an arm-bed truck, the method comprising the steps of:
   engaging an arm of the arm-bed truck with a tank carrier;
   lifting the tank carrier onto a bed of the arm-bed truck;
   engaging the arm of the arm-bed truck with a spray rig;
   dispersing a liquid of the tank carrier from a nozzle on the spray rig.

16. The method of claim 15, wherein the tank carrier comprises:
   a receptacle; and
   a receiver configured to receive the arm of the arm-bed tuck.

17. The method of claim 15, wherein the spray rig comprises:
   a sleeve configured to engage the arm of the arm-bed truck; and
   a first spray boom engaged with the sleeve.

* * * * *